United States Patent
Schroeder (10) Patent No.: US 12,457,916 B2
(45) Date of Patent: Nov. 4, 2025

(54) SYSTEMS AND METHODS FOR MONITORING DISC CONDITIONS OF AGRICULTURAL IMPLEMENTS USING SOIL DENSITY MEASUREMENTS

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

(*) Notice: Subject to any disclaimer, the term of this patent is extended or adjusted under 35 U.S.C. 154(b) by 681 days.

(21) Appl. No.: 17/828,221

(22) Filed: May 31, 2022

(65) Prior Publication Data
US 2023/0380325 A1 Nov. 30, 2023

(51) Int. Cl.
A01B 79/00 (2006.01)
G01N 9/00 (2006.01)

(52) U.S. Cl.
CPC .......... A01B 79/005 (2013.01); G01N 9/00 (2013.01)

(58) Field of Classification Search
CPC ................................ A01B 79/005; G01N 9/00
USPC ........................................................... 701/50
See application file for complete search history.

(56) References Cited

U.S. PATENT DOCUMENTS

| | | | |
|---|---|---|---|
| 9,265,192 B2 | 2/2016 | Chan et al. | |
| 10,145,837 B2 | 12/2018 | Troxler | |
| 10,757,854 B2 | 9/2020 | Stanhope | |
| 10,768,331 B2 | 9/2020 | Koch et al. | |
| 10,820,476 B2 | 11/2020 | Stoller et al. | |
| 11,041,716 B2 | 6/2021 | Shearer et al. | |
| 11,071,245 B2 | 7/2021 | Puhalla et al. | |
| 11,170,497 B2 | 11/2021 | Strnad et al. | |
| 2011/0284253 A1* | 11/2011 | Stevenson | A01B 49/027 172/311 |
| 2016/0066498 A1* | 3/2016 | Bassett | A01B 15/16 172/184 |
| 2020/0093054 A1* | 3/2020 | Aesaert | A01D 41/127 |
| 2020/0359559 A1 | 11/2020 | Koch et al. | |

(Continued)

FOREIGN PATENT DOCUMENTS

CA 2784210 C 4/2017

OTHER PUBLICATIONS

Jonard et al., "Characterization of tillage effects on the spatial variation of soil properties using ground-penetrating radar and electromagnetic induction," Geoderma 207-208 (2013) 310-322, 14 pages https://www.researchgate.net/publication/246766762_Characterization_of_tillage_effects_on_the_spatial_variation_of_soil_properties_using_groundpenetrating_radar_and_electromagnetic_induction/link/5f04c38b45851550509216fb/download.

*Primary Examiner* — Krishnan Ramesh
(74) *Attorney, Agent, or Firm* — Dority & Manning, P.A.

(57) ABSTRACT

In one aspect, a system for monitoring disc conditions of an agricultural implement includes a disc configured to penetrate through a soil surface during the performance of an agricultural operation, and a soil density sensor configured to generate data associated with a post-operation soil density of soil positioned aft of the disc relative to a direction of travel of the agricultural implement. In addition, the system includes a computing system communicatively coupled with the soil density sensor. The computing system is configured to monitor the post-operation soil density based on the data received from the soil density sensor, and determine an operating condition of the disc based at least in part on the post-operation soil density.

17 Claims, 7 Drawing Sheets

(56) References Cited

U.S. PATENT DOCUMENTS

| | | |
|---|---|---|
| 2020/0390024 A1* | 12/2020 | Naylor .................... G01S 17/87 |
| 2021/0037695 A1 | 2/2021 | Strnad et al. |
| 2021/0045281 A1* | 2/2021 | Glovier ................. A01B 15/00 |
| 2021/0100154 A1* | 4/2021 | Henry .................. A01B 21/086 |
| 2021/0105931 A1 | 4/2021 | Anderson, Jr. et al. |
| 2021/0190754 A1 | 6/2021 | Stoller et al. |
| 2023/0242095 A1* | 8/2023 | Johnson ................ B60K 35/81 701/48 |
| 2023/0263083 A1* | 8/2023 | Rains ...................... G01N 9/24 172/133 |
| 2023/0309437 A1* | 10/2023 | Palla ................... A01B 79/005 701/50 |

* cited by examiner

SYSTEMS AND METHODS FOR MONITORING DISC CONDITIONS OF AGRICULTURAL IMPLEMENTS USING SOIL DENSITY MEASUREMENTS

FIELD OF THE INVENTION

The present disclosure generally relates to agricultural implements and, more particularly, to systems and methods for detecting the condition of discs of an agricultural implement using soil density measurements.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tool assemblies configured to engage the soil as the implement is moved across the field. For example, in certain configurations, the implement may include one or more disc gang assemblies, leveling disc assemblies, rolling basket assemblies, shank assemblies, and/or the like. Such tool assemblies loosen and/or otherwise agitate the soil to prepare the field for subsequent planting operations.

Due to the nature of the operation being performed within a field, the rotating discs often become damaged. For instance, contact with rocks or other objects within the field can cause a disc to become bent or even broken. Additionally, in certain instances, a disc will fall off or otherwise become decoupled from the remainder of the implement. Such damaged or missing discs can result in the operation of the agricultural implement being rendered ineffective or unsuitable for performing its intended function. However, it is typically quite difficult for an operator to determine when a disc is damaged or missing, particularly during the performance of an active agricultural operation within the field.

Accordingly, a system and related method for monitoring the condition of discs of an agricultural implement (e.g., conditions associated with damaged or missing discs) would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring disc conditions of an agricultural implement. The system includes a disc configured to penetrate through a soil surface during the performance of an agricultural operation, and a soil density sensor configured to generate data associated with a post-operation soil density of soil positioned aft of the disc relative to a direction of travel of the agricultural implement. In addition, the system includes a computing system communicatively coupled with the soil density sensor. The computing system is configured to monitor the post-operation soil density based on the data received from the soil density sensor and determine an operating condition of the disc based at least in part on the post-operation soil density.

In another aspect, the present subject matter is directed to a method for monitoring disc conditions of an agricultural implement. The method includes receiving, with a computing system, data associated with a post-operation soil density of soil positioned aft of a disc of the agricultural implement relative to a direction of travel of the agricultural implement. In addition, the system includes determining, with the computing system, an operating condition of the disc based at least in part on the post-operation soil density, and initiating, with the computing system, a control action upon the determination of the operating condition of the disc.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for monitoring the condition of discs of an agricultural implement. In several embodiments, one or more soil density sensors may be supported relative to the implement such that the sensor(s) is configured to generate data associated with a soil density of the soil aft of or behind one or more discs of the implement (also referred to herein as "post-operation soil density"). A computing system may be configured to monitor the post-operation soil density to determine or identify when one or more of the discs are damaged or missing. For instance, the computing system may be configured to compare the measured post-operation soil density to a predetermined soil density range associated with an expected post-operation soil density for normal operation (e.g., for fully functional, non-damaged discs). If the measured post-operation soil density fails outside the predetermined soil density range, the computing system may determine that one or more discs of the implement are damaged or missing.

In another embodiment, in addition to monitoring post-operation soil density, one or more soil density sensors may be supported relative to the implement such that the sensor(s) are configured to generate data associated with a soil density of the soil forward or in front of one or more discs of the implement (also referred to herein as "pre-operation soil density"). In one embodiment, the computing system may be configured to compare the pre-operation and post-operation soil densities to determine a soil density differential associated with the change in density occurring due to the soil being worked by the disc(s). The determined soil density differential may then be analyzed to determine or identify when one or more of the discs are damaged or missing. For instance, in one embodiment, the computing system may be configured to compare the determined soil density differential to a predetermined differential range associated with expected soil density differential values for normal operation (e.g., for fully functional, non-damaged discs). If the determined soil density differential fails outside the predetermined differential range, the computing system may determine that one or more discs of the implement are damaged or missing.

As will be described below, in several embodiments, each soil density sensor may be configured to generate data associated with the soil density across a given lateral section or swath of the field, such as across all or a portion of the lateral width of the implement. In such embodiments, the soil density determined at a given lateral location or along a given lateral swath can be matched to an associated disc of the implement based on the alignment between the disc and lateral location/swath, thereby allowing the computing system to correlate the soil density data to the performance of each respective disc. As a result, by analyzing the soil density data across all or a portion of the lateral width of the implement, the computing system is not only capable of determining the presence of damaged or missing discs, but can also identify the location of the damaged or missing disc(s). The computing system may then, for example, generate an operator notification identifying which disc(s) is damaged or missing.

It should be appreciated that, although the present subject matter will generally be described herein with reference to discs of a disc gang assembly, the disclosed systems and methods can also be applied to individually mounted or non-ganged discs. Moreover, even though the present subject matter will generally be described herein with reference to discs of a tillage implement, the disclosed systems and methods can also be applied to discs of any other suitable agricultural implement, such as opener discs or closing discs of a planting implement or any other suitable disc or discs forming part of a given agricultural implement (e.g., sweeps or cultivators).

Figure 1:
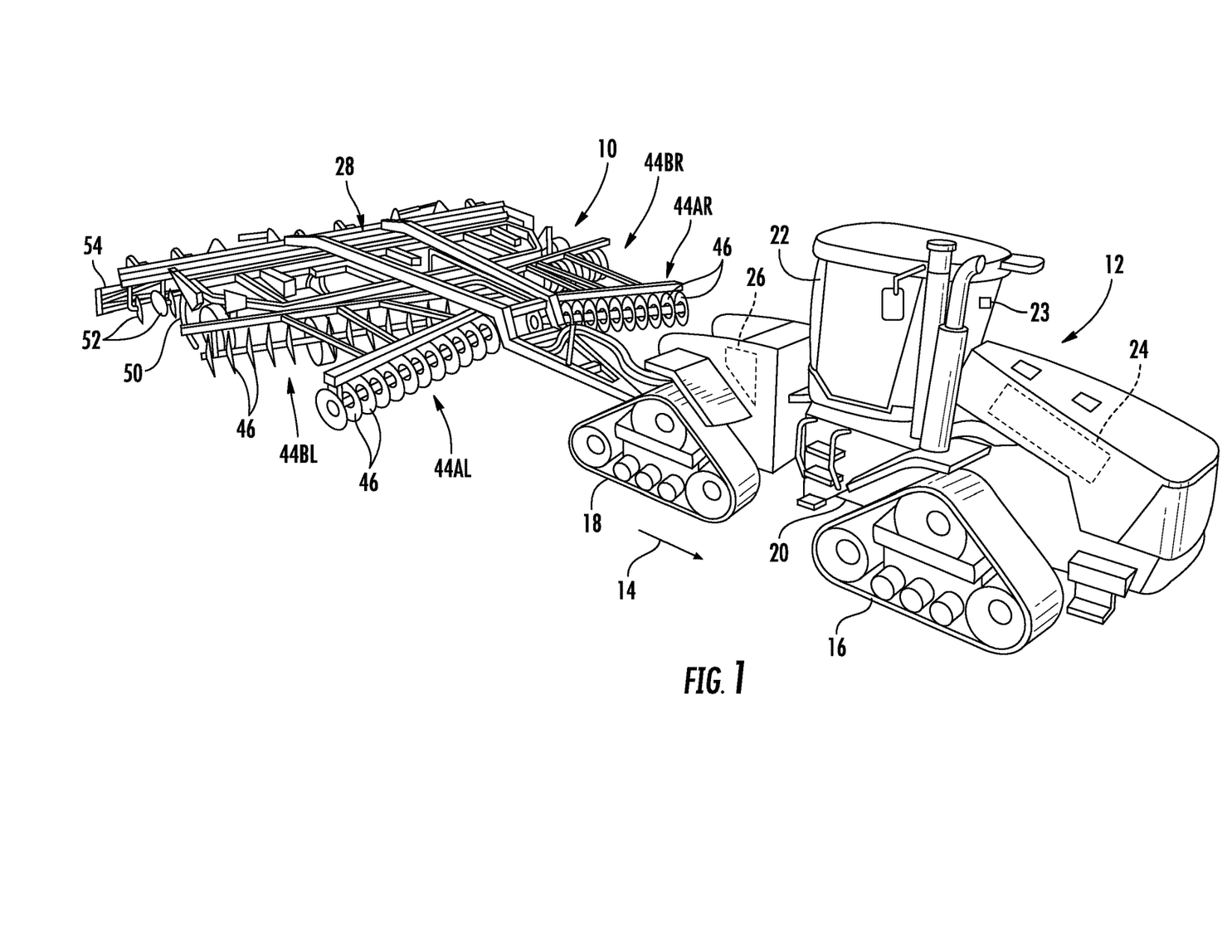
FIG. 1 illustrates a perspective view of one embodiment of an agricultural implement in accordance with aspects of the present subject matter, particularly illustrating the implement being towed by a work vehicle.
Figure 2:
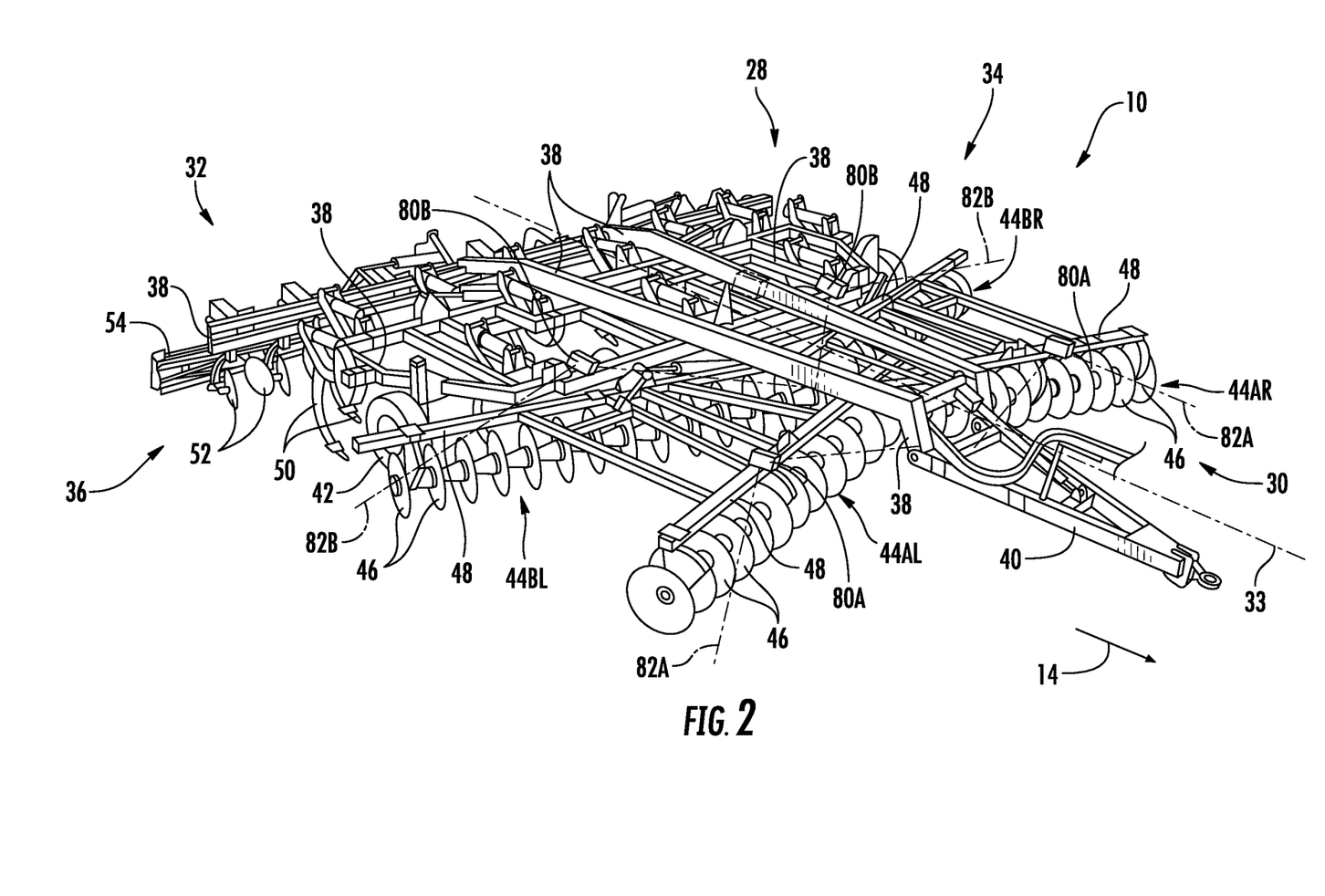
FIG. 2 illustrates another perspective view of the agricultural implement shown in FIG. 1 in accordance with aspects of the present subject matter, particularly illustrating the implement including one or more embodiments of soil density sensors installed relative thereto for monitoring the density of the soil within the field before and/or after the discs of the implement 10.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair of rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first lateral side 34 (e.g., a right side of the implement 10) and a second lateral side 36 (e.g., a left side of the implement 10), with a longitudinal centerline 33 of the implement frame 28 extending in the longitudinal direction between the forward and aft ends 30, 32 and generally dividing the first lateral side 34 from the second lateral side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tool assemblies. For instance, the frame 28 may support one or more disc gang assemblies 44. As illustrated in FIG. 2, each disc gang assembly 44 includes a toolbar 48 coupled to the implement frame 28 and a plurality of harrow discs 46 supported by the toolbar 48 relative to the implement frame 28. Each harrow disc 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported relative to the frame 28 at a location forward of the remainder of the ground-engaging tools. Specifically, the implement 10 includes a pair of front disc gang assemblies 44A (e.g., a left front disc gang assembly 44AL and a right front disc gang assembly 44AR) and a pair of rear disc gang assemblies 44B (e.g., a left rear disc gang assembly 44BL and a right rear disc gang assembly 44BR) positioned aft or rearward of the front disc gang assemblies 44A relative to the direction of travel 14 of the implement 10, with the right-side disc gang assemblies 44AR, 44BR being positioned on the right or first lateral side 34 of the implement 10 and the left-side disc gang assemblies 44AL, 44BL being positioned on the left or second lateral side 36 of the implement 10. It should be appreciated that, in alternative embodiments, the implement 10 may include any other suitable number of disc gang assemblies 44, such as more or less than four disc gang assemblies 44. Furthermore, in one embodiment, the disc gang assemblies 44 may be mounted to the frame 28 at any other suitable location, such as adjacent to its aft end 32.

Additionally, as shown, in one embodiment, the implement frame 28 may be configured to support other ground-engaging tool assemblies. For instance, in the illustrated embodiment, the frame 28 is configured to support a plurality of shank assemblies 50 configured to rip or otherwise till the soil as the implement 10 is towed across the field. Furthermore, in the illustrated embodiment, the frame 28 is also configured to support one or more finishing tool assemblies, such as a plurality of leveler disc assemblies 52 and/or rolling (or crumbler) basket assemblies 54. However, in other embodiments, any other suitable ground-engaging tool assemblies may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For instance, in another embodiment, as opposed to disc gang assemblies, the discs 46 may be individually mounted or supported relative to the frame 28. Additionally, in one embodiment, the implement 10 may be configured as a disc harrow that only includes discs 46 without any additional ground-engaging tools.

Referring still to FIGS. 1 and 2, in several embodiments, the implement 10 may also include one or more soil density sensors 80 supported relative thereto. Specifically, each soil density sensor 80 may be configured to be supported by or relative to the frame 28 such that the sensor 80 has a field of view 82 directed towards a portion of the field located forward of and/or aft of the discs 46 relative to the forward direction of travel 14. As a result, each soil density sensor 80 may be configured to generate data associated with either a pre-operation soil density of the soil (i.e., the soil density of the soil positioned in front or forward of the discs 46 relative to the direction of the travel prior to the soil being worked by the discs 46) or a post-operation soil density of the soil (i.e., the soil density of the soil positioned behind or aft of the discs 46 relative to the direction of the travel after the soil has been worked by the discs 46). In several embodiments, the implement 10 may include one or more forward-looking soil density sensors configured to generate data associated with the pre-operation density of the soil and one or more aft-looking soil density sensors configured to generate data associated with the post-operation density of the soil.

For instance, in the illustrated embodiment shown in FIG. 2, the implement 10 includes a pair of forward-looking soil density sensors 80A and a pair of aft-looking soil density sensors. Specifically, each forward-looking soil density sensor 80A has a field of view 82A directed towards the soil positioned out in front of a respective front disc gang assembly 44AL, 44AR, with the lateral width of each field of view 82A being equal to or greater than the lateral width of the associated front disc gang assembly 44AL, 44AR such that the forward-looking soil density sensors 80A collectively generate data associated with the soil density across the entire lateral width of the implement encompassed by the front disc gang assemblies 44AL, 44AR. Similarly, in the illustrated embodiment, each aft-looking soil density sensor 80B has a field of view 82B directed towards the soil positioned behind a respective rear disc gang assembly 44BL, 44BR, with the lateral width of each field of view 82B being equal to or greater than the lateral width of the associated rear disc gang assembly 44BL, 44BR such that the aft-looking soil density sensors 80B collectively generate data associated with the soil density across the entire lateral width of the implement encompassed by the rear disc gang assemblies 44BL, 44BR. However, in other embodiments, the implement 10 may include any other suitable number of forward-looking and/or aft-looking soil density sensors 80A, 80B defining respective fields of view 82A, 82B having any suitable lateral width. Moreover, as will be described below, as an alternative to including both forward-looking and aft-looking soil density sensors 80A, 80B, the implement 10 may only include one or more aft-looking soil density sensors 80B configured to generate data associated with the post-operation density of the soil.

It should be appreciated that, in general, each soil density sensor 80 may correspond to any suitable sensor or sensing device that is configured to generate data associated with the soil density within the field. For instance, in one embodiment, each soil density sensor 80 may correspond to a ground penetrating radar (GPR) configured to generate data associated with the density of the soil within the field. In another embodiment, each soil density sensor 80 may correspond to an electromagnetic induction (EMI) sensor configured to generate data associated with the density of the soil within the field. Alternatively, each soil density sensor 80 may correspond to any other suitable sensor or sensing device configured to generate data that is directly or indirectly related to the density of the soil within the field.

Figure 3:
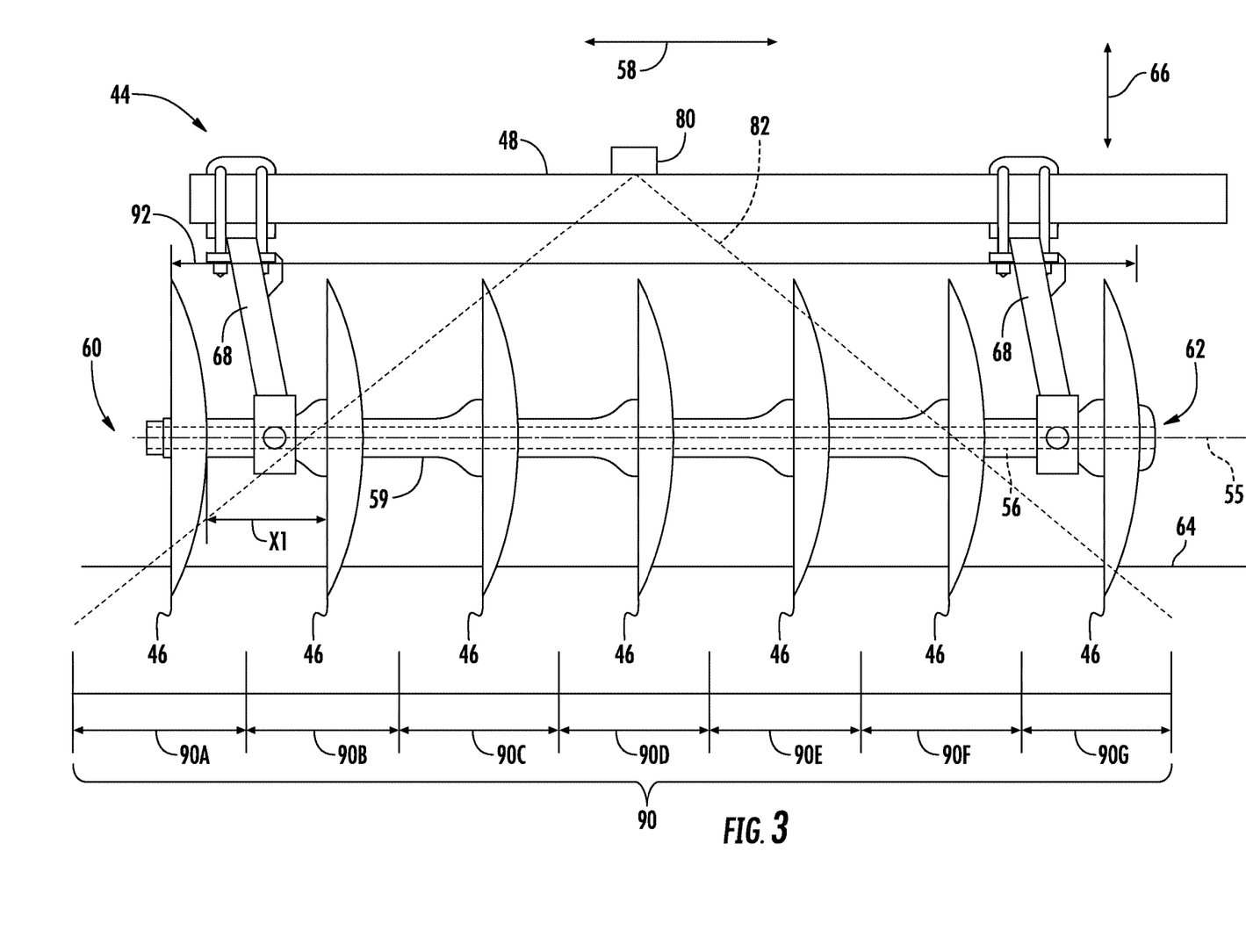
FIG. 3 illustrates a font view of one of the disc gang assemblies of the implement shown in FIGS. 1 and 2, particularly illustrating an exemplary lateral field of view of one embodiment of a soil density sensor in accordance with aspects of the present subject matter.

Referring now to FIG. 3, a front view of one of the disc gang assemblies 44 described above with reference to FIGS. 1 and 2 is illustrated in accordance with aspects of the present subject matter. As shown in FIG. 3, the disc gang assembly 44 may include a disc gang shaft (e.g., as indicated with dashed lines 56) that extends along an axial direction of the disc gang assembly 44 (e.g., as indicated by arrow 58) between a first end 60 and a second end 62. The disc gang shaft 56 may be positioned below the toolbar 48 of the disc gang assembly 44 along a vertical direction (e.g., as indicated by arrow 66) of the implement 10 and supported relative to the toolbar 48 by one or more hangers 68. However, in alternative embodiments, the disc gang shaft 56 may have any other suitable orientation. Each disc 46 may be rotatably coupled or keyed to the disc gang shaft 56. The disc gang shaft 56 defines a rotational axis (e.g., as indicated by dashed line 55) about which the discs 46 rotate. Each disc 46 may be spaced apart from an adjacent disc 46 in the axial direction 58 via spools 59 by a distance X1. As is generally understood, the discs 46 may be configured to penetrate through a soil surface 64 of the field and cut into the ground during the performance of an agricultural operation.

Additionally, FIG. 3 also illustrates one of the soil density sensors 80 described above as installed relative to the disc gang assembly 44. Specifically, in the illustrated embodiment, the soil density sensor 80 is mounted to the toolbar 48 such that the sensor 82 has a field of view 82 directed towards the soil positioned ahead of or behind the discs 46 (e.g., depending on whether the sensor 82 is configured as a forward-looking soil density sensor or an aft-looking soil density sensor). However, in other embodiments, the soil density sensor 80 may be mounted or supported relative to the disc gang assembly 44 in any other suitable manner, such as by being coupled directly or indirectly to any portion of the frame 28 (FIG. 2) of the implement 10.

As shown in FIG. 3, in one embodiment, the soil density sensor 80 may have a field of view 82 defining a lateral width 90 that is equal to or greater than a lateral width 92 defined across the discs 46 of the disc gang assembly 44, thereby allowing the sensor 80 to generate data associated with the soil density in front of or behind each disc 46. For instance, in the illustrated embodiment, the soil density sensor 80 may be configured to generate soil density data across a plurality of lateral swaths 90A-90G, with each lateral swath 90A-90G being aligned with a respective disc 46 of the disc gang assembly 44 in the direction of travel 14 (FIG. 2) of the implement 10. Thus, in accordance with aspects of the present subject matter, the soil density data may be analyzed to determine the operating condition of each individual disc 46 of the disc gang assembly 44 (e.g., via analyzing the soil density data collected for the aligned lateral swath 90A-90G within the field).

As will be described in greater detail below with reference to FIG. 4, the monitored soil density may be analyzed to identify or infer the operating condition of each respective disc 46 or disc pair (e.g., the front and matching rear disc 46). Specifically, when the discs 46 are operating normally (i.e., when the discs 46 are not damaged or missing), it is generally expected that each disc 46 will work the soil in a manner that results in the density of the soil after being worked by the disc 46 (i.e., the post-operation soil density) being less than the density of the soil prior to being worked by the disc 46 (i.e., the pre-operation soil density) by a given amount. In other words, it is generally expected that a soil density differential will exist between the post-operation soil density and the pre-operation soil density that falls within a known or predetermined soil density differential range. However, when a disc is damaged (e.g., bent or broken) or is missing, the soil is not worked as efficiently or effectively (or at all in the case of missing disc), thereby resulting in a post-operation soil density that differs from what would be expected under normal operating conditions.

For instance, when a disc bends, the soil density will often increase after being worked by the disc, thereby resulting in a post-operation soil density that is greater than the pre-operation soil density. Similarly, when a disc breaks, the soil density will often decrease after being worked by the disc (but by a smaller amount than during normal operation), thereby resulting in a higher post-operation soil density that what would be expected (and resulting in a lower soil density differential between the pre-operation and post-operation soil densities than what would be expected under normal conditions). Moreover, when a disc is missing, the soil will not be worked at all, thereby resulting in the post-operation soil density being substantially equal to the pre-operation soil density (and, thus, resulting in a soil density differential between the pre-operation and post-operation soil densities that is substantially equal to zero). It should be appreciated that, as used herein, the post-operation soil density will be considered to be substantially equal to the pre-operation soil density when the differential between such density values is equal to zero or is otherwise less than 1% of the post-operation soil density, such as less than 0.5% of the post-operation soil density or less than 0.25% of the post-operation soil density.

It should be appreciated that, when the implement 10 is configured to include both forward-looking and aft-looking soil density sensors, the pre-operation and post-operation soil densities may be compared to determine the operating condition of each associated disc 46. For instance, as indicated above, if the post-operation density is greater than the pre-operation density for the soil within a given lateral swath of the field, it may be determined that the disc 46 aligned with such lateral swath is damaged (e.g., bent). Similarly, if the post-operation density is substantially equal to the pre-operation density for the soil within a given lateral swath of the field, it may be determined that the disc 46 aligned with such lateral swath is missing.

Additionally, the comparison between the pre-operation and post-operation soil densities may also be based on the differential between such density values. For instance, in one embodiment, the soil density differential between the pre-operation and post-operation soil densities may be compared to a threshold density differential range corresponding to the expected soil density differential under normal conditions. In such an embodiment, when the soil density differential between the pre-operation and post-operation soil densities for the soil within a given lateral swath of the field falls outside the threshold density differential range, it may be determined that the disc 46 aligned with such lateral swath is damaged (e.g., bent or broken) or missing, depending on the degree and manner in which the determined soil density differential differs from the threshold range.

In other embodiments, when the implement 10 is configured to only include aft-looking soil density sensors, the post-operation soil density may be analyzed to determine the operating condition of each associated disc 46. For instance, with the discs 46 operating at a given penetration depth and cutting angle under normal conditions, it may generally be expected that the density of the soil after being worked by the discs will fall within a known or predetermined post-operation soil density range. As such, when the monitored post-operation soil density for the soil within a given lateral swath of the field falls outside the predetermined post-operation soil density range, it may be determined that the disc 46 aligned with such lateral swath is damaged (e.g., bent or broken) or missing, depending on the degree and manner in which the monitored post-operation soil density differs from the predetermined post-operation soil density range.

Figure 4:
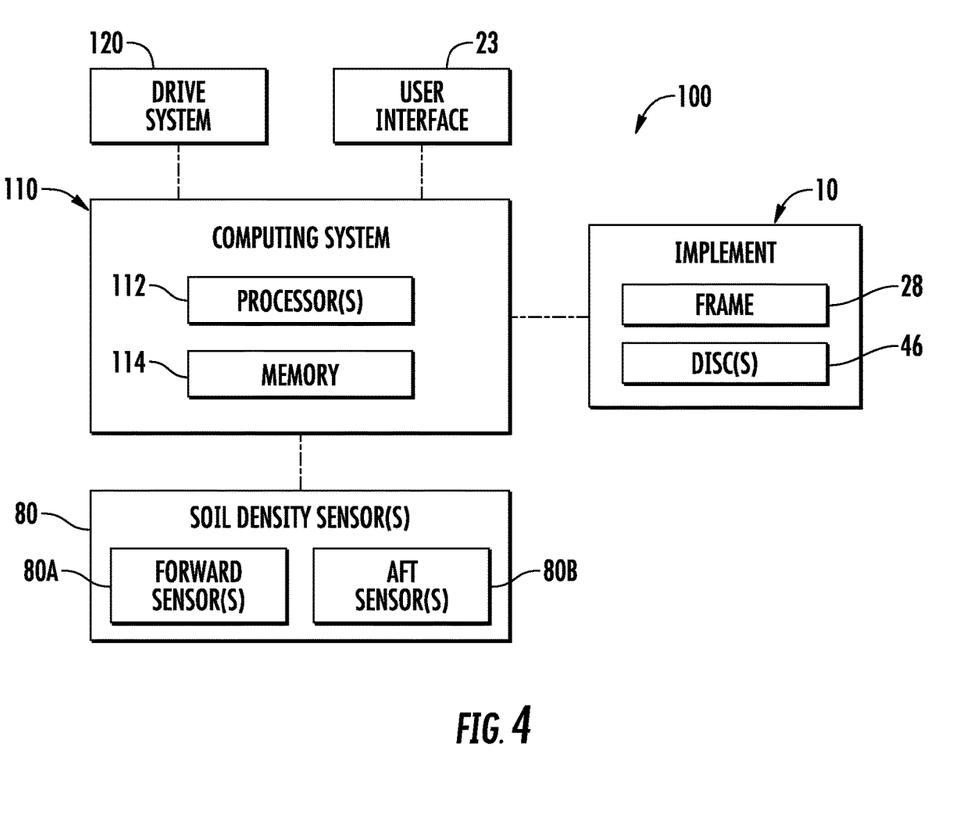
FIG. 4 illustrates a schematic view of one embodiment of a system for monitoring disc conditions of an agricultural implement in accordance with aspects of the present subject matter.

Referring now to FIG. 4, a schematic view of one embodiment of a system 100 for monitoring the disc conditions of an agricultural implement is illustrated in accordance with aspects of the present subject matter. In general, the system 100 will be described herein with reference to the implement 10 and related discs 46 described above with reference to FIGS. 1-3. However, it should be appreciated by those of ordinary skill in the art that the disclosed system 100 may generally be utilized with agricultural implements having any other suitable implement configuration and/or with discs having any other suitable disc configuration (including individually mounted or non-ganged discs).

In general, the system 100 may include an agricultural implement and/or one or more components of an agricultural implement, such as the agricultural implement 10 described above and/or one or more of its components. For example, as shown in FIG. 4, the system 100 may include one or more discs 46 configured to be supported relative to a frame 28 of the implement 10, such as the discs 46 of one or more of the front disc gang assemblies 44AL, 44AR and/or one or more of the rear disc gang assemblies 44BL, 44BR of the implement 10 described above. Additionally, the system 100 may include one or more soil density sensors 80 configured to generate data indicative of the density of the soil within the field. For instance, as described above, the system 100 may, in one embodiment, may include one or more forward-looking soil density sensors 80A configured to generate data associated with the pre-operation density of the soil and one or more aft-looking soil density sensors 80B configured to generate data associated with the post-operation density of the soil. Alternatively, the system 100 may only include aft-looking soil density sensors 80B.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the density of the soil within the field based on the data received from the soil density sensor(s) 80. Specifically, in one embodiment, the computing system 110 may be communicatively coupled to the soil density sensor(s) 80 (e.g., via a wired or wireless connection) to allow the density-related data associated with the measured soil density to be transmitted to the computing system 110, including data associated with the pre-operation soil density and/or post-operation soil density. The monitored soil densities may then be analyzed to infer or identify an operating condition of one or more of the discs 46. Specifically, as indicated above, the monitored soil densities may be analyzed to determine when a given disc(s) 46 is damaged (broken or bent) or is completely missing from its expected location.

Figure 5A:
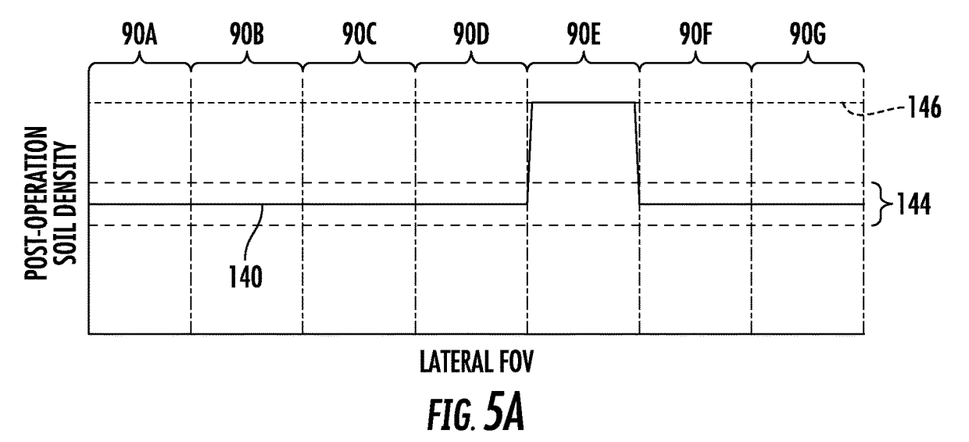
FIG. 5A illustrates an example data graph or trace of post-operation soil densities measured across the lateral field of view (FOV) of an associated soil density sensor, particularly illustrating a data trace representative of one of the discs aligned with the field of view of the sensor being missing.
Figure 5B:
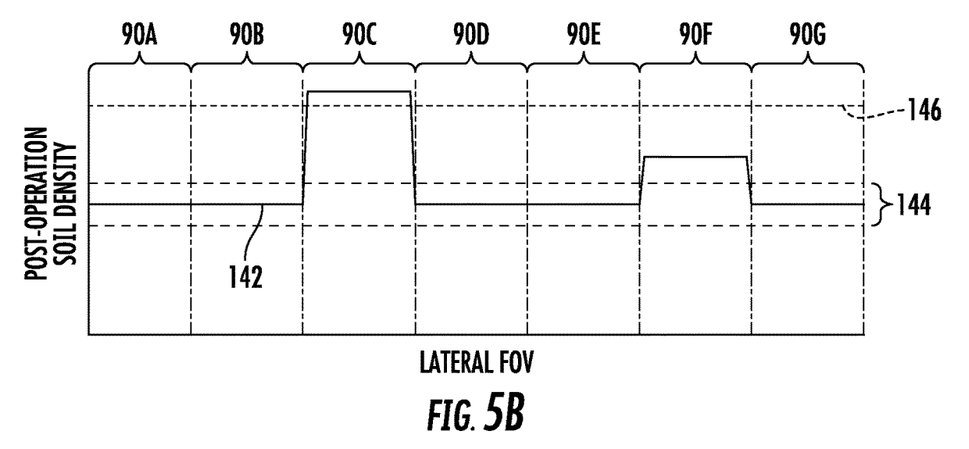
FIG. 5B illustrates another example data graph or trace of post-operation soil densities measured across the lateral field of view (FOV) of an associated soil density sensor, particularly illustrating a data trace representative of two of the discs aligned with the field of view of the sensor being damaged.

For instance, FIGS. 5A and 5B illustrate example data graphs or traces of post-operation soil densities measured across the lateral field of view (FOV) of an associated soil density sensor 80, particularly illustrating a data trace 140 (FIG. 5A) representative of one of the discs 46 aligned with the field of view of the sensor 80 being missing (e.g., the disc aligned with lateral swath 90E) and a data trace 142 (FIG. 5B) representative of two of the discs 46 aligned with the field of view of the sensor 80 being damaged (e.g., the discs aligned with lateral swaths 90C and 90F). It should be appreciated that, for purposes of illustration, the lateral width of the field of view of the sensor 80 is generally shown as being the same as the lateral width of the sensor 80 described above with reference to FIG. 3, particularly illustrating the lateral width extending across various lateral field swaths 90A-90G, with each swath being aligned with a respective disc 46 of the associated disc gang assembly 44.

As shown in FIGS. 5A and 5B, during normal operating conditions, it is generally expected that the post-operation soil density with each lateral swath of the sensor's field of view will generally fall within a predetermined post-operation density range (indicated by range 144). However, when one of the discs 46 is damaged or missing, the post-operation soil density within the associated lateral swath will fall outside such anticipated or expected range 144. For instance, as shown in FIG. 5A, the post-operation soil density measured within lateral swath 90E falls outside the predetermined range 144, thereby indicating that the associated disc 46 is damaged or missing. Specifically, in the illustrated embodiment of FIG. 5A, the post-operation soil density measured within lateral swath 90E is substantially equal to the pre-operation soil density for such lateral swath 90E (with such density value being represented by dashed line 146), thereby indicating that the soil was not worked at all across the lateral swath 90E. As such, it may be determined that the associated disc 46 is missing.

Similarly, as shown in FIG. 5B, the post-operation soil densities measured within lateral swaths 90C, 90F fall outside the predetermined range 144, thereby indicating that the associated discs 46 are damaged or missing. Specifically, in the illustrated embodiment of FIG. 5B, the post-operation soil density measured within lateral swath 90C is greater than the pre-operation soil density for such lateral swath 90C (with such density value being represented by dashed line 146), thereby indicating that the soil density increased after being worked by the disc 46 aligned with lateral swath 90C. As such, it may be determined that the associated disc 46 is likely bent. Similarly, the post-operation soil density measured within lateral swath 90F is greater than maximum value for the predetermined range 144 associated with normal disc operation and is less than the pre-operation soil density for such lateral swath 90F (with such density value being represented by dashed line 146), thereby indicating that the soil density was decreased after being worked by the disc 46 aligned with lateral swath 90C, but by an amount less than what was anticipated or expected. As such, it may be determined that the associated disc 46 is likely broken.

Figure 6A:
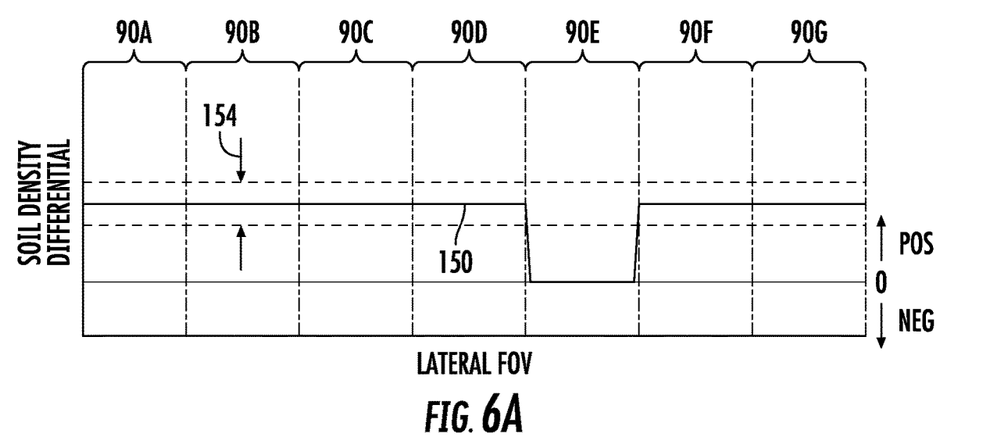
FIG. 6A illustrates an example data graph or trace of soil density differentials calculated between pre-operation and post-operation soil densities measured across the lateral field of view (FOV) of an associated soil density sensor, particularly illustrating a data trace representative of one of the discs aligned with the field of view of the sensor being missing.
Figure 6B:
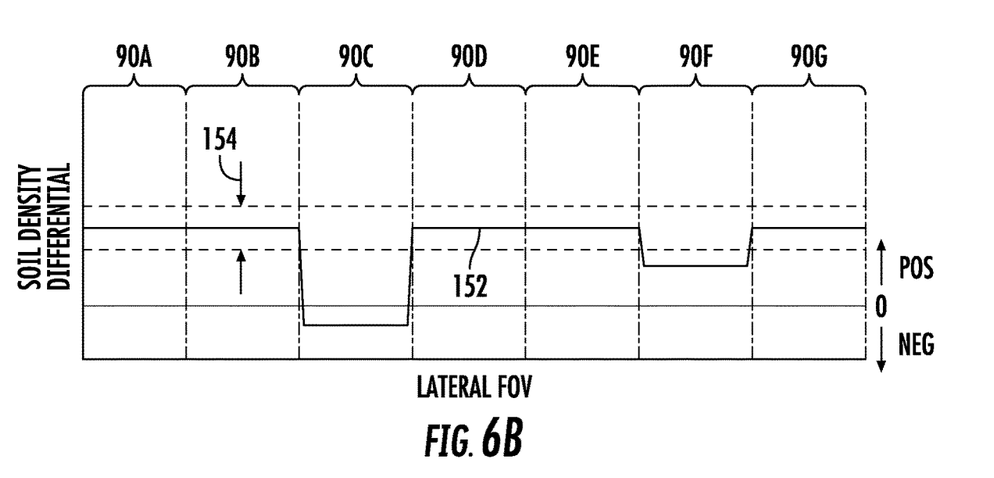
FIG. 6B illustrates another example data graph or trace of soil density differentials calculated between pre-operation and post-operation soil densities measured across the lateral field of view (FOV) of an associated soil density sensor, particularly illustrating a data trace representative of two of the discs aligned with the field of view of the sensor being damaged.

Additionally, FIGS. 6A and 6B illustrate example data graphs or traces of soil density differentials calculated between pre-operation and post-operation soil densities measured across the lateral field of view (FOV) of an associated soil density sensor 80, particularly illustrating a data trace 150 (FIG. 6A) representative of one of the discs 46 aligned with the field of view of the sensor 80 being missing (e.g., the disc aligned with lateral swath 90E) and a data trace 152 (FIG. 6B) representative of two of the discs 46 aligned with the field of view of the sensor 80 being damaged (e.g., the discs aligned with lateral swaths 90C and 90F). It should be appreciated that, for purposes of illustration, the lateral width of the field of view of the sensor 80 is generally shown as being the same as the lateral width of the sensor 80 described above with reference to FIG. 3, particularly illustrating the lateral width extending across various lateral field swaths 90A-90G, with each swath being aligned with a respective disc 46 of the associated disc gang assembly 44. It should also be appreciated that, for purposes of description, a positive soil density differential value (i.e., a value positioned above the origin or "zero line" in FIGS. 6A, and 6B) is indicative of the pre-operation density value being greater than the associated post-operation density value, while a negative soil density differential value (i.e., a value positioned below the origin or "zero line" in FIGS. 6A, and 6B) is indicative of the pre-operation density value being less than the associated post-operation density value.

As shown in FIGS. 6A and 6B, during normal operating conditions, it is generally expected that the differential between the pre-operation and post-operation soil densities within each lateral swath of the sensor's field of view will generally fall within a predetermined differential range (indicated by range 154). However, when one of the discs 46 is damaged or missing, the soil density differential within the associated lateral swath with fall outside such anticipated or expected range 154. For instance, as shown in FIG. 6A, the soil density differential calculated for lateral swath 90E falls outside the predetermined range 154, thereby indicating that the associated disc 46 is damaged or missing. Specifically, in the illustrated embodiment of FIG. 6A, the soil density differential for lateral swath 90E is substantially equal to zero, thereby indicating that the soil was not worked at all across the lateral swath 90E. As such, it may be determined that the associated disc 46 is missing.

Similarly, as shown in FIG. 6B, the soil density differentials calculated for lateral swaths 90C, 90F fall outside the predetermined range 154, thereby indicating that the associated discs 46 are damaged or missing. Specifically, in the illustrated embodiment of FIG. 6B, the soil density differential for lateral swath 90C corresponds to a negative differential value, thereby indicating that the soil density increased after being worked by the disc 46 aligned with lateral swath 90C. As such, it may be determined that the associated disc 46 is likely bent. Similarly, the soil density differential for lateral swath 90F corresponds to a positive value that is less than the minimum value for the predetermined range 154 associated with normal disc operation. thereby indicating that the soil density was decreased after being worked by the disc 46 aligned with lateral swath 90C, but by an amount less than what was anticipated or expected. As such, it may be determined that the associated disc 46 is likely broken.

Referring back to FIG. 4, as indicated above, the computing system 110 may be configured to monitor the soil densities to identify when one or more of the discs 46 is damaged or missing. Moreover, when it is determined that a given disc 46 is damaged or missing, the computing system 110 may be configured to automatically initiate one or more control actions. For example, the computing system 110 may be configured to provide the operator with a notification that a given disc 46 is damaged or missing. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication of the operational status of the disc 46 (e.g., as damaged or missing). In such instance, the operator may then choose to initiate any suitable corrective action he/she believes is necessary, such as adjusting the ground speed of the implement 10 (including bringing the implement to a stop).

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the ground speed of the implement 10 in response to determining that a disc 46 is damaged or missing, such as by actively controlling a drive system 120 of the work vehicle 12 (e.g., the engine 24 and/or the transmission 26 of the work vehicle 12) to safely bring the vehicle/implement to a stop.

Figure 7:
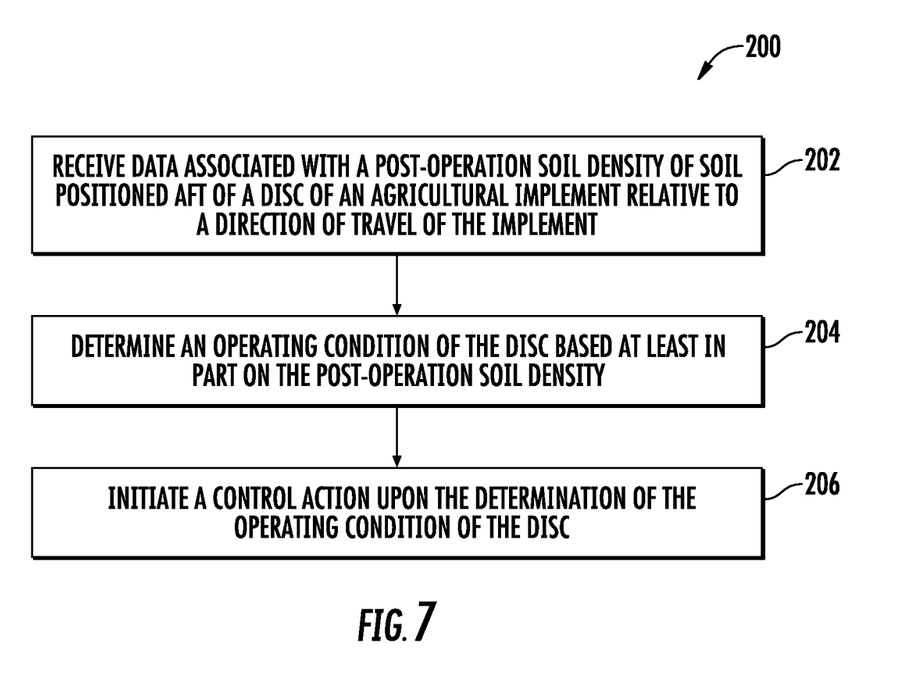
FIG. 7 illustrates a flow diagram of one embodiment of a method for monitoring disc conditions of an agricultural implement in accordance with aspects of the present subject matter.

Referring now to FIG. 7, a flow diagram of one embodiment of a method 200 for monitoring disc conditions of an agricultural implement is illustrated in accordance with aspects of the present subject matter. In general, the method 200 will be described herein with reference to the agricultural implement 10, discs 46, and system 100 described above with reference to FIGS. 1-4. However, it should be appreciated by those of ordinary skill in the art that the disclosed method 200 may generally be utilized in association with agricultural implements having any suitable implement configuration, discs having any other suitable disc configuration, and/or systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving data associated with a post-operation soil density of soil positioned aft of a disc of an agricultural implement relative to a direction of travel of the implement. For instance, as indicated above, the computing system 110 may be communicatively coupled to one or more associated soil density sensors 80, thereby allowing the computing system 110 to receive data associated with the density of the soil within the field. Specifically, when the computing system 110 is communicatively coupled to an aft-looking soil density sensor 80A, the computing system 110 may be also configured to receive data associated with the post-operation density of the soil within the field. Additionally, when the computing system 110 is communicatively coupled to a forward-looking soil density sensor 80B, the computing system 110 may also be configured to receive data associated with the pre-operation density of the soil within the field.

Additionally, at (204), the method 200 may include determining an operating condition of the disc based at least in part on the post-operation soil density. Specifically, as indicated above, the computing system 110 may be configured to analyze the soil density data to determined when a given disc is damaged or missing. For instance, in one embodiment, the computing system 110 may be configured to solely analyze post-operation density data to identify the operating condition of one or more discs, such as by comparing the post-operation density data to a predetermined post-operation density range. In another embodiment, the computing system 110 may be configured to analyze post-operation and pre-operation density data to identify the operating condition of one or more discs, such as by determining a differential value between the pre-operation and post-operation soil densities and by comparing such differential to a predetermined density differential range.

Moreover, at (206), the method 200 may include initiating a control action upon the determination of the operating condition of the disc. For instance, as indicated above, upon the detection of a damaged or missing disc, the computing system 110 may be configured to initiate a control action. Specifically, in one embodiment, the computing system 110 may be configured to generate an operator notification, such as by providing an alert to the operator via the user interface 23 of the associated work vehicle 12. In another embodiment, the computing system 110 may be configured to automatically adjust the operation of the implement 10, such as by reducing the speed of the implement 110 (including stopping the implement 10).

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring disc conditions of agricultural implements, the system comprising:
   an agricultural implement comprising a plurality of discs configured to penetrate through a soil surface during the performance of an agricultural operation;
   a soil density sensor configured to generate data associated with a post-operation soil density of soil positioned aft of at least one disc of the plurality of discs relative to a direction of travel of the agricultural implement; and
   a computing system communicatively coupled with the soil density sensor, the computing system being configured to:
      monitor the post-operation soil density based on the data received from the soil density sensor during the performance of the agricultural operation;
      compare the post-operation soil density to a threshold soil density range; and determine an operating condition of the at least one disc based at least in part on the comparison between the post-operation soil density and the threshold soil density range.

2. The system of claim 1, wherein the computing system is configured to determine that the at least one disc is damaged or missing when the post-operation soil density falls outside the threshold soil density range.

3. The system of claim 1, wherein the soil density sensor comprises one of a ground-penetrating radar (GPR) or an electromagnetic induction (EMI) sensor.

4. The system of claim 1, wherein the computing system is further configured to initiate a control action during the performance of the agricultural operation upon the determination of the operating condition of the at least one disc.

5. The system of claim 4, wherein the control action comprises automatically adjusting an operation of the agricultural implement or an associated work vehicle.

6. A method for monitoring disc conditions of an agricultural implement, the method comprising:
performing an agricultural operation within a field using a plurality of discs of the agricultural implement;
sensing, using a soil density sensor during the performance of the agricultural operation, data associated with a post-operation soil density of soil positioned aft of at least one disc of the plurality of discs of the agricultural implement relative to a direction of travel of the agricultural implement;
receiving, with a computing system, data associated with the post-operation soil density
comparing the post-operation soil density to a threshold soil density range;
determining, with the computing system, an operating condition of the at least one disc based at least in part on the comparison between post-operation soil density and the threshold soil density range; and
initiating, with the computing system during the performance of the agricultural operation, a control action upon the determination of the operating condition of the at least one disc.

7. The method of claim 6, wherein determining the operating condition of the at least one disc comprises determining that the at least one disc is damaged or missing when the post-operation soil density falls outside the threshold soil density range.

8. The method claim 6, wherein receiving the data comprises receiving the data from a soil density sensor, the soil density sensor comprising one of a ground-penetrating radar (GPR) or an electromagnetic induction (EMI) sensor.

9. The method of claim 6, wherein initiating the control action comprises initiating a control action to automatically adjust an operation of the agricultural implement or an associated work vehicle.

10. A system for monitoring disc conditions of agricultural implements, the system comprising:
an agricultural implement comprising a plurality of discs configured to penetrate through a soil surface during the performance of an agricultural operation;
a first soil density sensor configured to generate data associated with a post-operation soil density of soil positioned aft of at least one disc of the plurality of discs relative to a direction of travel of the agricultural implement;
a second soil density sensor configured to generate data associated with a pre-operation soil density of the soil positioned forward of the at least one disc relative to the direction of travel of the agricultural implement;
a computing system communicatively coupled with the first and second soil density sensors, the computing system being configured to:
monitor the post-operation soil density based on the data received from the first soil density sensor during the performance of the agricultural operation;
monitor the pre-operation soil density based on the data received from the second soil density sensor; and
determine an operating condition of the at least one disc based at least in part on the post-operation soil density and the pre-operation soil density,
wherein the computing system is configured to at least one of: determine that the at least one disc is damaged when the post-operation soil density is greater than the pre-operation soil density; or determine that the at least one disc is missing when the post-operation soil density is substantially equal to the pre-operation soil density.

11. The system of claim 10, wherein the computing system is configured to determine that the disc is damaged or missing when soil density differential falls outside the threshold density differential range.

12. A system for monitoring disc conditions of agricultural implements, the system comprising:
an agricultural implement comprising a plurality of discs configured to penetrate through a soil surface during the performance of an agricultural operation;
a first soil density sensor configured to generate data associated with a post-operation soil density of soil positioned aft of at least one disc of the plurality of discs relative to a direction of travel of the agricultural implement;
a second soil density sensor configured to generate data associated with a pre-operation soil density of the soil positioned forward of the at least one disc relative to the direction of travel of the agricultural implement;
a computing system communicatively coupled with the first and second soil density sensors, the computing system being configured to:
monitor the post-operation soil density based on the data received from the first soil density sensor during the performance of the agricultural operation;
monitor the pre-operation soil density based on the data received from the second soil density sensor during the performance of the agricultural operation;
determine a soil density differential between the post-operation soil density and the pre-operation soil density;
compare the soil density differential to a threshold density differential range
determine an operating condition of the at least one disc based on the comparison between the soil density differential and threshold density differential range.

13. A system for monitoring disc conditions of agricultural implements, the system comprising:
an agricultural implement comprising a plurality of discs configured to penetrate through a soil surface during the performance of an agricultural operation;
a soil density sensor configured to generate data associated with a post-operation soil density of soil positioned aft of the plurality of discs relative to a direction of travel of the agricultural implement, the soil density sensor having a field of view extending across a lateral swath that is aligned with two or more of the plurality of discs in the direction of travel of the implement; and
a computing system communicatively coupled with the soil density sensor, the computing system being configured to:

monitor the post-operation soil density based on the data received from the soil density sensor; and determine an operating condition of each individual disc of the two or more of the plurality of discs based at least in part on the post-operation soil density across the lateral swath.

14. A method for monitoring disc conditions of an agricultural implement, the method comprising:

performing an agricultural operation within a field using a plurality of discs of the agricultural implement;

sensing, using a first soil density sensor during the performance of the agricultural operation, data associated with a post-operation soil density of soil positioned aft of at least one disc of the plurality of discs of the agricultural implement relative to a direction of travel of the agricultural implement;

sensing, using a second soil density sensor during the performance of the agricultural operation, data associated with a pre-operation soil density of soil positioned forward of at least one disc of the plurality of discs of the agricultural implement relative to a direction of travel of the agricultural implement;

receiving, with a computing system, data associated with the post-operation soil density and the pre-operation soil density;

determining, with the computing system, an operating condition of the at least one disc based at least in part on the post-operation soil density; and initiating, with the computing system during the performance of the agricultural operation, a control action upon the determination of the operating condition of the at least one disc, wherein determining the operating condition of the at least one disc comprises at least one of: determining that the at least one disc is damaged when the post-operation soil density is greater than the pre-operation soil density; or determining that the at least one disc is missing when the post-operation soil density is substantially equal to the pre-operation soil density.

15. A method for monitoring disc conditions of an agricultural implement, the method comprising:

performing an agricultural operation within a field using a plurality of discs of the agricultural implement;

sensing, using a first soil density sensor during the performance of the agricultural operation, data associated with a post-operation soil density of soil positioned aft of at least one disc of the plurality of discs of the agricultural implement relative to a direction of travel of the agricultural implement;

sensing, using a second soil density sensor during the performance of the agricultural operation, data associated with a pre-operation soil density of soil positioned forward of at least one disc of the plurality of discs of the agricultural implement relative to a direction of travel of the agricultural implement;

receiving, with a computing system, data associated with the post-operation soil density and the pre-operation soil density;

determining, with the computing system, a soil density differential between the post-operation soil density and the pre-operation soil density;

comparing, with the computing system, the soil density differential to a threshold density differential range;

determining, with the computing system, an operating condition of the at least one disc based on the comparison between the soil density differential and threshold density differential range; and initiating, with the computing system during the performance of the agricultural operation, a control action upon the determination of the operating condition of the at least one disc.

16. The method of claim 15, wherein determining the operating condition of the at least one disc comprises determining that the at least one disc is damaged or missing when soil density differential falls outside the threshold density differential range.

17. A method for monitoring disc conditions of an agricultural implement, the method comprising:

performing an agricultural operation within a field using a plurality of discs of the agricultural implement, the plurality of discs forming a disc gang assembly of the agricultural implement;

sensing, using a soil density sensor during the performance of the agricultural operation, data associated with a post-operation soil density of soil extending across a lateral swath that is aligned with two or more of the plurality of discs in a direction of travel of the implement receiving, with a computing system, data associated with the post-operation soil density determining, with the computing system, an operating condition of each individual disc of the two or more of the plurality of discs based at least in part on the post-operation soil density across the lateral swath; and initiating, with the computing system during the performance of the agricultural operation, a control action upon the determination of the operating condition of the at least one disc.

* * * * *